United States Patent
Moore et al.

[19]

[11] Patent Number: 5,851,569
[45] Date of Patent: Dec. 22, 1998

[54] COLD EDGE FOLDING APPARATUS FOR MAKING DOOR INSERTS FOR AUTOMOBILE DOORS

[75] Inventors: Steven Christopher Moore, Harrison Township; Ken DeVon Noack, Huntington Woods, both of Mich.

[73] Assignee: Mexican Industries of Michigan, Inc., Detroit, Mich.

[21] Appl. No.: 760,100

[22] Filed: Dec. 3, 1996

[51] Int. Cl.⁶ .............................. B29C 31/00; B29C 63/04
[52] U.S. Cl. .......................... 425/504; 156/216; 156/479; 156/556; 425/403.1; 425/515; 425/518; 425/521
[58] Field of Search ...................... 425/504, 515, 425/518, 521, 403.1; 156/226, 479, 556, 216

[56] References Cited

U.S. PATENT DOCUMENTS

| | | | |
|---|---|---|---|
| 3,936,520 | 2/1976 | Garofalo | 264/322 |
| 4,221,556 | 9/1980 | Kiss | 425/398 |
| 4,571,320 | 2/1986 | Walker | 425/403.1 |
| 4,779,390 | 10/1988 | Repper et al. | 52/222 |
| 5,139,604 | 8/1992 | Mitchell | 156/479 |
| 5,164,140 | 11/1992 | Siano | 425/398 |
| 5,176,922 | 1/1993 | Balsano et al. | 425/398 |
| 5,264,069 | 11/1993 | Dietrich et al. | 156/556 |
| 5,297,842 | 3/1994 | Hayashi | 52/222 |
| 5,304,273 | 4/1994 | Kenrick et al. | 264/257 |
| 5,456,513 | 10/1995 | Schmidt | 296/39.1 |
| 5,609,709 | 3/1997 | Doumae et al. | 156/216 |
| 5,718,791 | 2/1998 | Spengler | 156/216 |

FOREIGN PATENT DOCUMENTS

0 533 311 A1  3/1993  European Pat. Off. ............... 156/216

*Primary Examiner*—Robert Davis
*Attorney, Agent, or Firm*—Dykema Gossett PLLC

[57] ABSTRACT

A method an apparatus for forming a trim insert particularly suited for automotive purposes such as a door insert includes a first carrier which holds the substrate and a second carrier which holds a material larger than the substrate. A drive assembly is connected to the first and second carriers to position the first and second carriers. A positioner positions the substrate from the first carrier and together with the substrate of the material on the second carrier. An edge folder is used to fold the material around the substrate to contact an adhesive on the second side of the substrate. The second carrier may have a contoured mold to form a desired wrinkle pattern in the material prior to folding the material.

4 Claims, 6 Drawing Sheets

COLD EDGE FOLDING APPARATUS FOR MAKING DOOR INSERTS FOR AUTOMOBILE DOORS

BACKGROUND OF THE INVENTION

The present invention relates generally to trim inserts for automotive vehicles, and more specifically, to a method and apparatus for repeatably forming trim inserts.

Various trim inserts are used in automotive vehicles. Typically, trim inserts are formed of a material different from that into which it is inserted. For example, on an automotive vehicle door, a trim insert having a finished surface of cloth, vinyl or leather may be inserted into an otherwise plastic door panel. Trim inserts are commonly used to provide increased aesthetic appeal to the component into which it is inserted.

The trim insert is usually formed as a separate component by wrapping a finished material around a substrate. The trim insert is typically manufactured by hand then fastened to the door panel.

Providing wrinkles or puckers especially in leather or vinyl furniture presents a desirable comfortable look. Automakers have mimicked this look in seats and other trim components. Providing this wrinkled or puckered look in trim components is a very labor intensive process. To form such wrinkles, the material is shirt or gather sewn on the top and bottom edge of the vinyl or leather to form the wrinkles or puckers. The shirr sewing process tensions the material on one edge greater than the other edge so that when stretched over a substrate, wrinkles appear on the finished surface of the part. One drawback to such a process is that consistency is very operator dependent. That is, the depth of the wrinkles and the number of the wrinkles are all controlled by the operator. Further, the amount of stretching of the material over the substrate also determines the number and depth of these wrinkles. Once stretched, the material is stapled to the substrate. The placement of the staples in the substrate also may change the pattern of the wrinkles on the finished surface.

Another drawback to conventional processes is that each step requires hand processing. The processing time and thus the labor costs for forming trim inserts are relatively high.

Automotive vehicle manufacturers require consistency in the manufacture of all components. It would therefore be desirable to eliminate operator inconsistencies in the manufacture of trim inserts while providing a low cost manufacturing solution.

SUMMARY OF THE INVENTION

Briefly, a trim insert formed according to the present invention has a generally planar substrate having a first side and a second side. An adhesive is applied to the second side. A sheet of material larger than the substrate is placed adjacent to the first side and wrapped around to the second side to contact the adhesive. The material may have a preformed wrinkle pattern prior to folding. A foam layer may be placed between the material and the substrate to make the trim insert softer feeling.

The apparatus to form a trim insert includes a first carrier which holds the substrate and a second carrier which holds a material larger than the substrate. A drive assembly is connected to the first and second carriers to position the first and second carriers. An adhesive dispenser may be used to dispense adhesive along the edge of the substrate. A positioner lifts the substrate from the first carrier and places the substrate onto the material on the second carrier. An edge flipper is used to fold the material around the substrate to contact the adhesive and form the part.

In one embodiment, a foam layer is affixed to the substrate prior to inserting the substrate on the first carrier. The foam provides the component with a desirable softer feel.

In another embodiment of the invention, a method for forming a trim insert includes placing a substrate onto a first carrier and placing a material onto a second carrier. Adhesive is applied to one side of the substrate. The substrate is removed from the first carrier and placed onto the material on the second carrier. The edges are then folded so that the edge of the material contacts the adhesive to affix the material to the substrate.

In yet another aspect of the invention, wrinkles may be formed by providing a mold on the second carrier into which the material is placed. The mold may have a plurality of contours which will later correspond to a desired wrinkle pattern of the material. A plunger is used to press the material into the contours of the mold. One configuration of this embodiment includes a vacuum that is applied to the material through holes in the mold to assist in conforming the material into the contours. The material is held in place while the substrate is placed on the material and until the material is folded to contact the adhesive.

One advantage of the present invention is that since these steps have been automated, wrinkles may be consistently formed into the material prior to affixing the material to the substrate.

Another advantage of the present invention is that a significant amount of time is saved in forming a trim insert since many manual steps are eliminated.

Yet another advantage of the present invention is that a similar machine and process may be used to make trim components with a predetermined wrinkle pattern and without wrinkles.

BRIEF DESCRIPTION OF THE DRAWINGS

Other features and advantages of the present invention will become apparent from the following detailed description which should be read in conjunction with the drawings in which.

DETAILED DESCRIPTION OF THE PREFERRED EMBODIMENT

Referring now to the drawings, like reference numerals are used to identify identical component in the various views. Although the invention will be illustrated in the context of a trim insert for a vehicle door, it will be appreciated that this invention may be used in conjunction with other trim applications.

Figure 1:
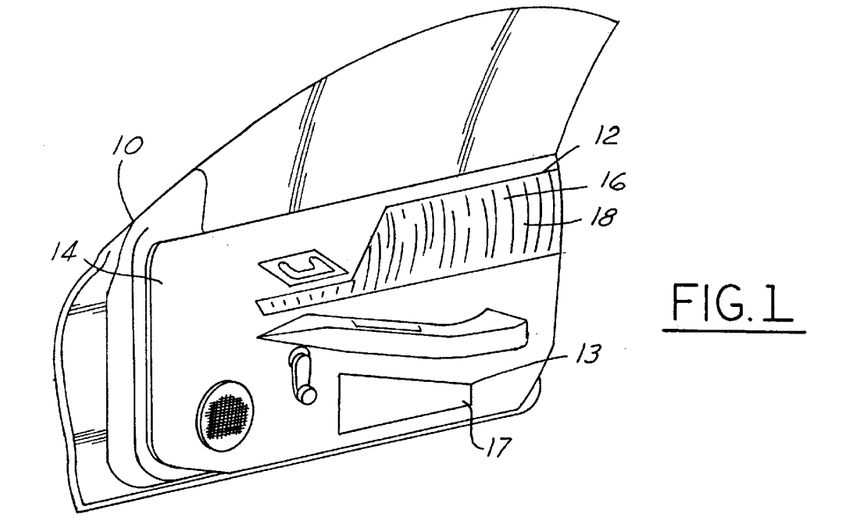
FIG. 1 is a perspective view of an automotive vehicle door having a trim insert formed according to the present invention.

Referring now to FIG. 1, an automotive vehicle door 10 is shown having a trim insert 12. As shown, trim insert 12 is mounted to an interior portion of a door panel 14. The terms, interior, exterior, rearward and forward, as used in this description, are related to the door as installed in a vehicle body. The door illustrated is a passenger side door. A driver side door would essentially be the mirror of the passenger side door.

Trim insert 12 may have a surface 16 with a predetermined number of wrinkles 18. Another trim insert 13 may also be used as an alternative to or in addition to trim insert 12. Trim insert 13 may have a surface 17 that is smooth, i.e., free from wrinkles.

Figure 2:
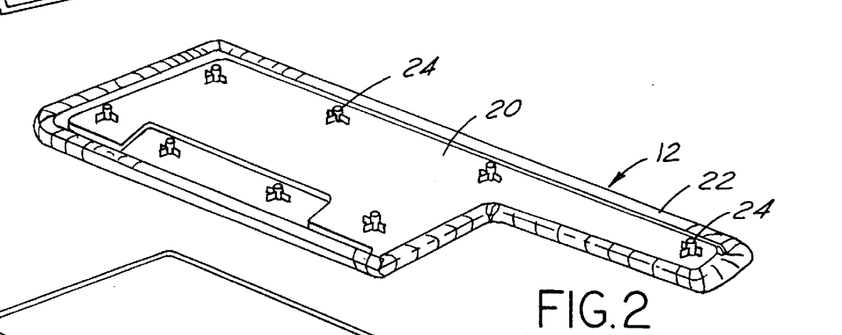
FIG. 2 is a perspective view of the backside of a trim insert.

Referring now to FIG. 2, a back side of trim insert 12 is shown. Trim insert 12 has a substrate 20 around which a material 22 is wrapped. Substrate 20 may be formed in a conventional manner from a rigid material such as a plastic like ABS. Substrate 20 may have nubs 24. Nubs 24 may be used as a means for affixing trim panel 12 to door panel 14 or as a place for gripping substrate 20 during processing.

Material 22 may be made from a pliable sheet-like material such as cloth, vinyl or leather. Material 22 is sized larger than substrate 20. Material 22 is preferably sized so that at least a portion of material 22 extends around each edge to the back side of substrate 20.

Figure 3:
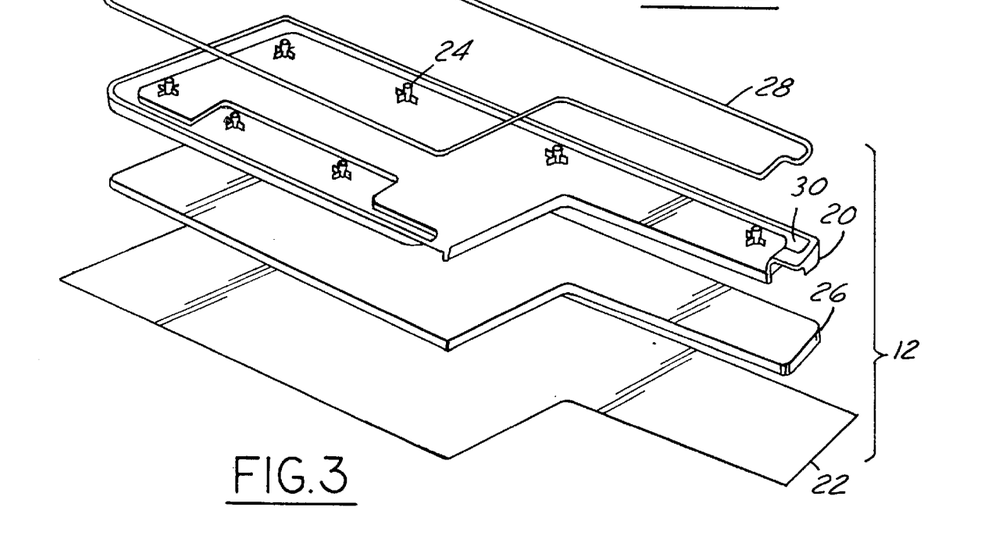
FIG. 3 is an exploded view of a trim insert.

Referring now to FIG. 3, foam 26 may be placed between sheet-like material 22 and substrate 20. Foam 26 may, for example, be a foam rubber material. Foam 26 provides a desirable aesthetically pleasing soft feeling to trim insert 12. Substrate 20 may have foam 26 attached thereto by adhesive prior to installing sheet-like material 22.

To affix material 22 to substrate 20, an adhesive 28 may be applied to substrate 20. Adhesive 28 must be capable of rapidly bonding material 22 to substrate 20. Adhesive 28 is preferably formed in a continuous line near the edges of substrate 20 where material 22, when folded around substrate 20, contacts adhesive 28. Substrate 20 may have a groove 30 near some or all of the edges. Adhesive 28 may be deposited into groove 30.

Additional means may be used to affix material 22 to substrate 20. For example, the affixing means may include but may not be limited to an adhesive backed vinyl, sonic welding and stapling the material to the substrate.

Figure 4:
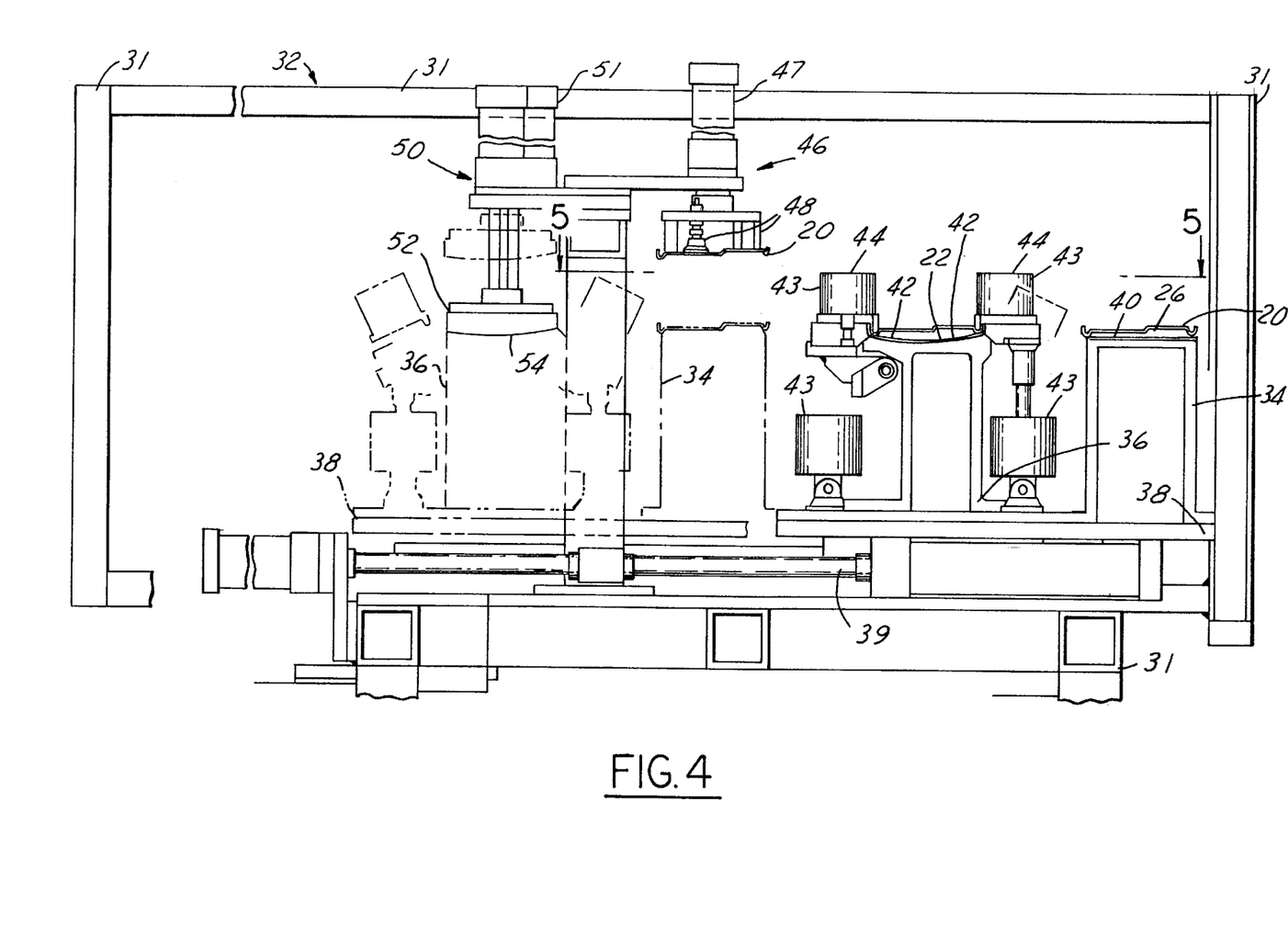
FIG. 4 is a front elevational view of a trim insert forming machine according to the present invention.

Referring now to FIG. 4, a machine or apparatus 32 for forming a trim insert 12 is shown. A frame 31 generally provides the support structure for machine 32. Frame 31 may extend across the top, sides and bottom of machine 32. Although not shown, machine 32 may be enclosed by panels on its sides and top. Panels help prevent debris from entering the machine. Some of the panels may be of clear plastic so that the process utilized in machine 32 may be monitored.

Machine 32 has a first carrier 34 and a second carrier 36. First carrier 34 and second carrier 36 are preferably secured to a plate 38 so that first carrier 34 and second carrier 36 move together in machine 32. First carrier 34 may have a cavity 40 into which substrate 20 and foam 26 (if used) are placed. Substrate 20 has foam 26 affixed to the surface of substrate 20 prior to placement of substrate 20 and foam 26 into cavity 40.

Second carrier 36 has a mold 42 into which material 22 is placed. The finished side is placed downward into mold 42. Mold 42 should be free from debris or rough edges to prevent damage to the finished surface of the material. Mold 42 may be smooth or have contours formed therein to form wrinkles.

Material 22 is sized larger than mold 42. Edge folders 44 are placed adjacent to second carrier 36. The operation of edge folders 44 will be further described below. A cylinder 43 may be used to control the movement of edge folder 44 by fluid control, i.e., pneumatically or hydraulically or by the use of a motor.

To position material 22 and substrate 20, a drive assembly 39 and a lifter 46 are used. Plate 38 is preferably connected to a drive assembly 39 to move plate 38. Drive assembly 39 may be motor, pneumatically or hydraulically driven.

Lifter 46 is supported by frame 31 of machine 32 and is used to lift substrate 20 from cavity 40 when first carrier 34 is aligned under lifter 46. A cylinder 47 may be used to control the movement of lifter 46 by fluid control, i.e., pneumatically or hydraulically or by the use of a motor. Grippers 48 are located at the end of lifter 46 and are used to grip substrate 20. Grippers 48 may for example be used to grip nubs 24.

A conforming means 50 also may be connected to machine 32. Conforming means 50 is used to conform material 22 against mold 42 of second carrier 36. A plunger 52 which retractably extends from conforming means 50 preferably has an end 54 shaped to cooperate with the shape of mold 42. A cylinder 51 may be used to control the movement of conforming means by pressure control, i.e., air or hydraulically or by the use of a motor.

As stated above, first carrier 34 and second carrier 36 are preferably connected to plate 38 which is connected to drive assembly 39. In certain circumstances it may be desirable for drive assembly 39 to be connected to lifter 46 and conforming means 50 while first carrier 34 and second carrier 36 remain stationary.

Figure 5:
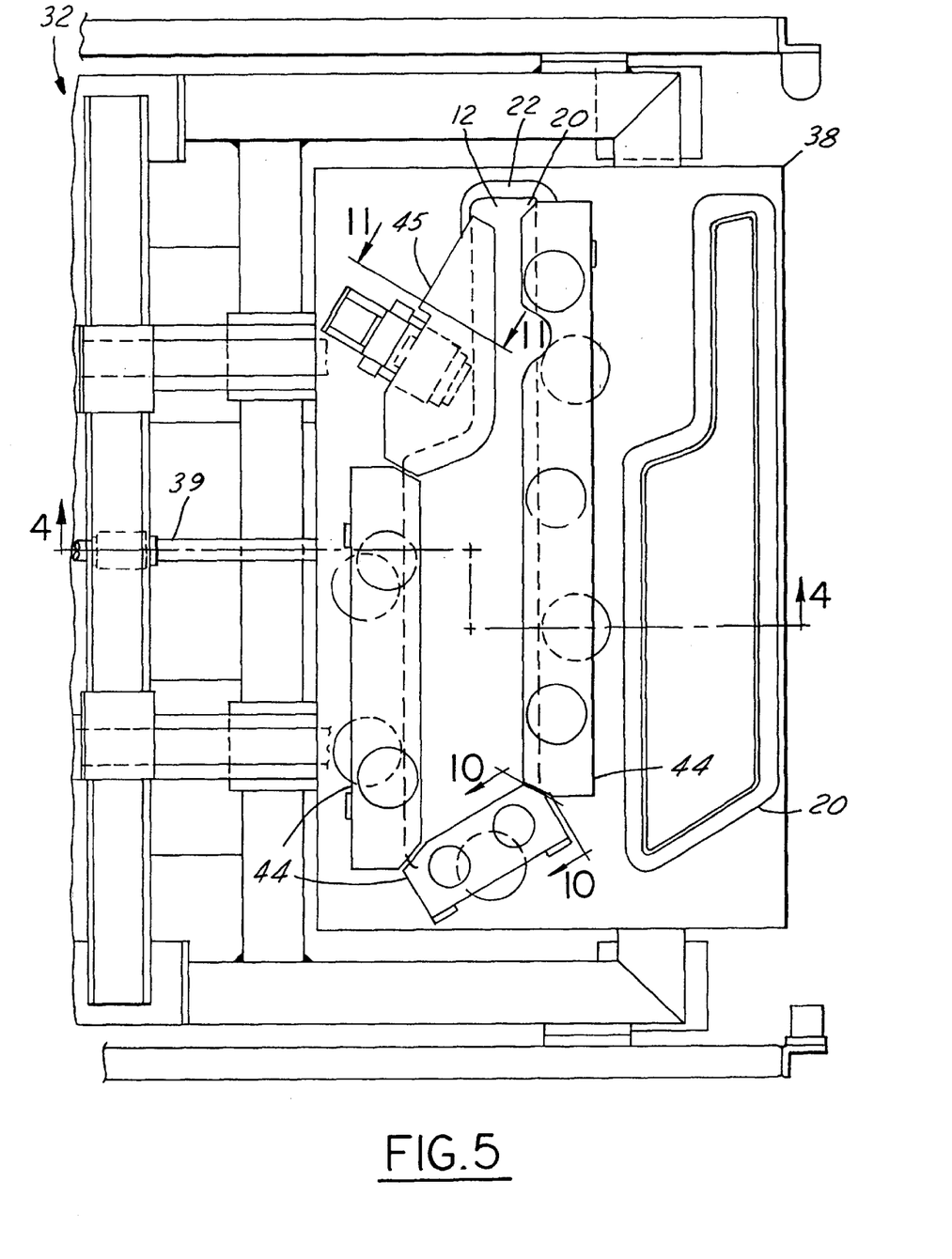
FIG. 5 is a partial top view of the first two positions of a trim insert forming machine according to the present invention.

Referring now to FIG. 5, a partial top view of a machine or apparatus 32 shows the relative position of substrate 20 located on first carrier 34 and an assembled trim insert 12 located on the second carrier. Trim insert 12 is shown during contact with edge folders 44. For illustrative purposes, both a substrate 20 on the first carrier 34 and a completed trim insert 12 on second carrier 36 are shown. During edge flipping, however, no substrate 20 would be present. Likewise, when a substrate is placed on first carrier 34, edge folders 44 would be in the open position for loading of material 22.

Figure 6:
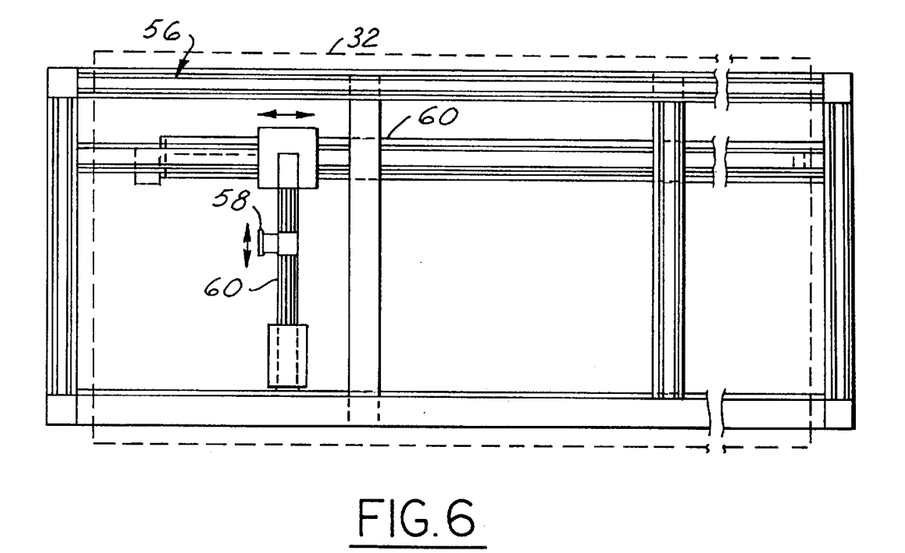
FIG. 6 is a top view of a glue dispensing apparatus, with parts broken away, with a trim insert forming machine shown in dotted lines.

Referring now to FIG. 6, adhesive may be applied to the substrate using an adhesive dispensing machine 56. Glue dispensing machines are common in the industry. Adhesive dispensing machine 56 has a dispensing head 58. Dispensing head 58 moves in a conventional manner along rails 60. For simplicity, adhesive dispensing machine 56 may be a separate unit placed over machine 32 so that dispensing head 58 can extend into machine 32. Adhesive dispensing machine 56 also may be an integral part of machine 32. Adhesive dispensing machine 56 moves dispensing head 58 along a path to apply adhesive to substrate 20. The path preferably parallels the edges of the substrate. Because the adhesive dispensing step is only one short step, glue dispensing machine 56 may share a single dispensing head with an adjacent trim insert forming machine.

Figure 7:
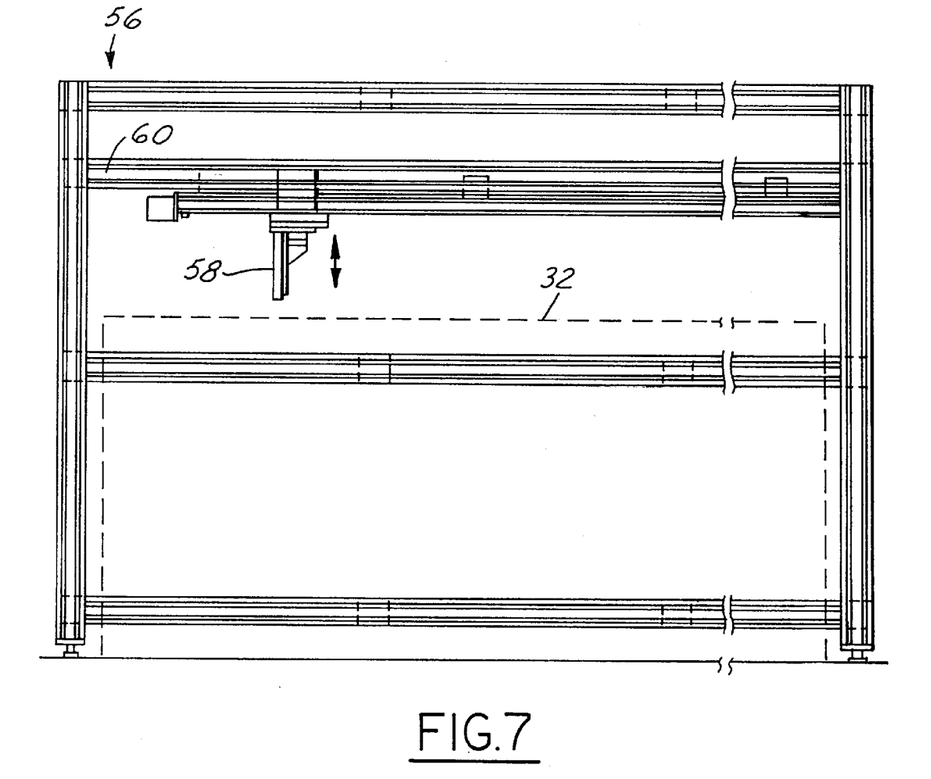
FIG. 7 is a front elevational view of a glue dispensing apparatus, with parts broken away, with a trim insert forming machine shown in dotted lines.

Referring now to FIG. 7, an elevational view of the adhesive dispensing machine 56 is shown with its dispensing head 58 in its upmost position. When dispensing of adhesive is desired, dispensing head 58 is lowered into machine 32 close to the substrate where a line of glue is applied to the substrate.

Figure 8:
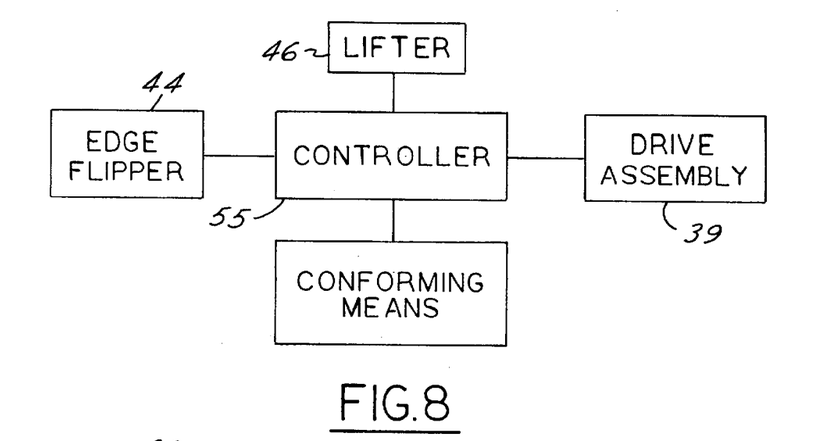
FIG. 8 is a simplified block diagram of the trim insert machine.

Referring now to FIG. 8, a simplified block diagram is shown of machine 32. A controller 55 may be used to control the synchronization of the various steps performed by the machine to form the trim insert. Controller 55 is preferably connected to edge folder 44, lifter 46, drive assembly 39 and conforming means 50. Controller 55 may be a microprocessor based computer such as a programmable logic controller (PLC). If entirely hydraulically controlled, controller may control the movement of the various portions of the machine by controlling the hydraulic pressures in the various devices.

Referring now to FIG. 9, a simplified top view of machine 32 is shown with the relative positions of first carrier 34 and second carrier 36. Machine 32 has four positions for first carrier 34 and second carrier 36.

Figure 9A:
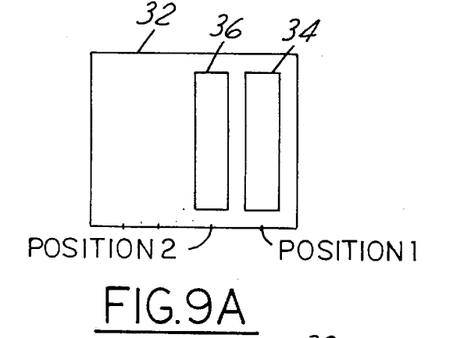
FIGS. 9A through 9D are simplified diagrammatic top views of the various positions of the carriers within the trim insert forming machine.

In FIG. 9A, first carrier 34 is in Position 1 and second carrier 36 is in Position 2. In Position 1 first carrier 34 is loaded with substrate preferably having foam already attached thereto so that the back side of the substrate is facing up. Adhesive is preferably applied to substrate in Position 1.

In Position 2, a material is loaded into the mold of second carrier 36 with its finished side down.

Figure 9B:
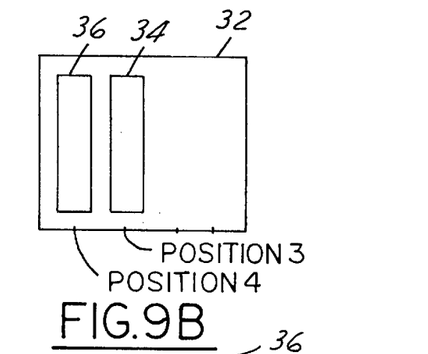

In FIG. 9B, first carrier 34 is moved to Position 3 and second carrier 36 is moved to Position 4. In Position 3, the lifter lifts the substrate from first carrier 34.

In Position 4, plunger 52 forces the material against the mold of second carrier 36. A vacuum applied through mold 42 may be used to hold material 22 within mold 42. If a smooth surface is desired, i.e., without wrinkles, conforming may be eliminated.

Figure 9C:
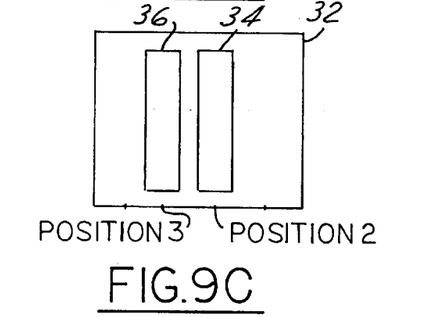

In FIG. 9C, both first carrier 34 and second carrier 36 are moved back one position so that first carrier 34 is in Position 2 and second carrier is in Position 3. First carrier 34 is now empty. Lifter 46 places the substrate and foam onto the material on second carrier 36. Also in Position 3, edge folders fold material over the substrate and hold material so that the material contacts the adhesive on substrate.

Figure 9D:
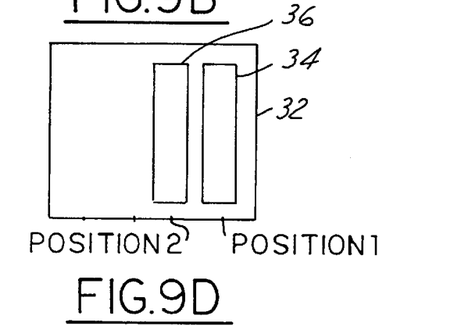

In FIG. 9D, first carrier 34 has moved back to Position 1 and second carrier 36 is moved to Position 2. The finished trim insert is then removed from Position 2 and the process may then continue when a substrate and material are reloaded.

As an additional step before edge folder 44 folds material onto substrate to contact the adhesive, the material may be locally heated to make material more pliable to further facilitate folding. For example, the second mold may be warmed to 100 degrees F. to increase the pliability of certain materials.

Figures 10, 11:
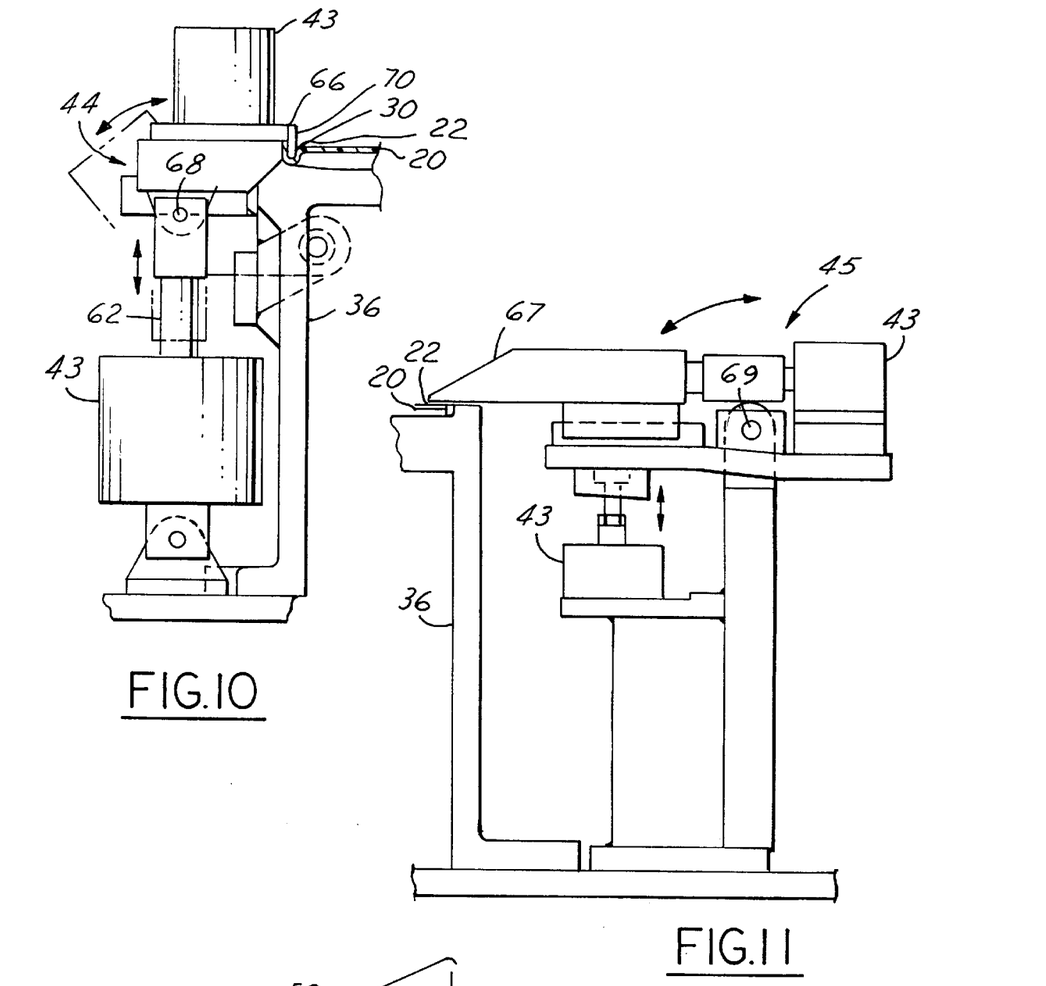
FIG. 10 is an elevational of an edge folder taken on the line 10—10 of FIG. 5.
FIG. 11 is an elevational view of a modified edge folder taken on the line 11—11 of FIG. 5.

Referring now to FIG. 10, a side view of a typical edge folder 44 is shown. Edge folder 44 has a shaft 62 which extends from a cylinder 43. Cylinder 43 may be air pressure controlled or hydraulic controlled. Pressure within cylinder 43 forces shaft 62 to extend from or return to cylinder 43. Edge folder 44 has an element 66 that rotates about a pivot axis 68. Element 66 will force material into groove 30 on substrate 20 to contact the adhesive. Element 66 may have a finger 70 that is shaped to force material within groove 30 of the substrate so that the material is secured to the substrate to form a finished insert.

Referring now to FIG. 11, a similar edge folder 45 to that of FIG. 10 is shown. Edge folder 45 is used for portions of substrate 30 that do not have a groove. Edge folder 45 is mounted to rotate about a pivot shaft 69. Edge folder 45 does not have a finger 70 for insertion within a groove. Element 67 has a triangular shape. Edge folder 45 uses element 67 to force material 22 in contact with adhesive on substrate 30. Of course, various modifications to edge folder 45 would be apparent to those skilled in the art due to various shapes and configurations of substrate 20. Also, an air pressure controlled edge folder 45 has been illustrated, various edge folders may use motors or the like for controlling the movement of the edge folder.

Figure 12:
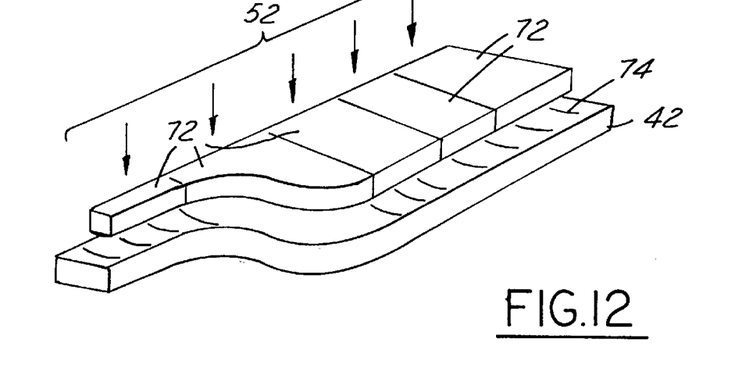
FIG. 12 is a perspective view of a multi-unit plunger.

Referring now to FIG. 12, plunger 52 may be comprised of a number of individual plunger units 72. Each plunger unit 72 may be individually actuatable so that, for example, the center plunger contacts material first and thereafter adjacent plunger units 72 contact the material until the end is reached. Moving from the middle of the component to the end component has been found to increase uniformity of the material within mold 42, particularly, if mold 42 has contours 74 for forming wrinkles in the material.

Figure 13:
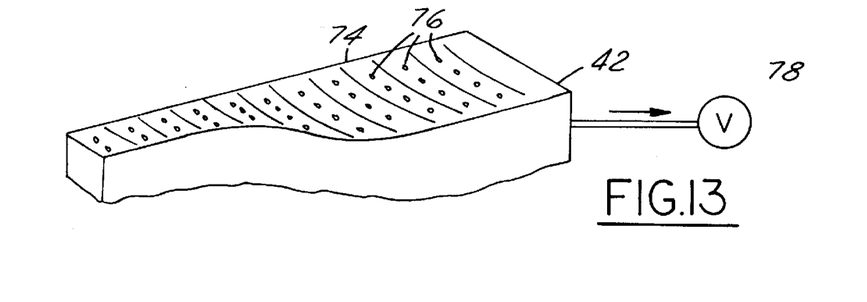
FIG. 13 is a perspective view of a mold for forming wrinkles in the material.

Referring now to FIG. 13, a mold 42 used for forming wrinkles is shown. Mold 42 has contours 74 spaced a desired distance across mold 42 to provide the desired wrinkle pattern in the material. To assist in forming the material within contour 74, holes 76 may be provided. Holes 76 are preferably connected to a vacuum source 78 to draw and hold material into contour 74.

While the best mode for carrying out the present invention has been described in detail, those familiar with the art to which this invention relates will recognize various alternative designs and embodiments for practicing the invention as defined by the following claims. For example the plunger and lifter may be move relative to the first and second carriers.

What is claimed is:

1. An apparatus with positions 1–4 for forming a trim insert having a substrate with a first side which receives an adhesive and a second side and a material, said apparatus comprising:

a frame;

a horizontal plate mounted on said frame for horizontal movement;

a first carrier mounted on said plate at position 1 which receives the substrate and where adhesive is applied to the substrate;

a second carrier including a mold mounted on said plate at position 2 which receives the material;

an edge folder proximate to and moveable with said second carrier;

first means for horizontally moving said plate and said first carrier to position 3 and said second carrier to position 4;

a positioner proximate to and located above said first carrier when at position 3 where said positioner lifts the substrate from said first carrier;

conforming means proximate to and located above said second carrier at position 4 to conform the material against the mold of said second carrier at position 4;

said conforming means including a control cylinder including a plunger which retractably extends therefrom and presses the material into said mold of said second carrier at position 4;

means for applying a vacuum through said mold to hold the material within the mold at position 4;

said first means thereafter moving said plate and said first carrier from position 3 to position 2 and said second carrier from position 4 to position 3 where said first carrier is now empty and said positioner places the substrate onto the second carrier at position 3, said edge folder at position 3 folding the material over the substrate and holding the material so that the material contacts and is adhesively secured to the substrate;

said first means thereafter returning said plate and said first carrier to positeion 1 for reloading of a substrate and said second carrier to position 2 where the finished trim insert is removed from said second carrier and for reloading of the material thereon;

said first means for horizontally moving said plate and said first carrier and said second carrier including a drive assembly coupled to said plate; and a controller coupled to said drive assembly, said positioner and said edge folder, said controller controlling movement of said first carrier and said second carrier to the several positions, initiating said positioner to lift the substrate, initiating said positioner to place the substrate on the material, and initiating said edge folder to fold the material over an edge of the substrate.

2. An apparatus for forming a trim insert as recited in claim 1 wherein said plunger comprises a plurality of plunger units that are individual controllable.

3. An apparatus for forming a trim insert as recited in claim 1 wherein said mold comprises a plurality of contours, said mold having a plurality of holes in said controls, said vacuum means being connected to said holes for drawing the material into said mold and holding the material.

4. An apparatus for forming a trim insert as recited in claim 2 wherein said plunger units contact the material generally from an interior portion to an exterior portion.

* * * * *